United States Patent
Blazaitis et al.

[11] Patent Number: 6,042,140
[45] Date of Patent: Mar. 28, 2000

[54] AIR BAG COVER HAVING A VISUALLY PERCEPTIBLE TEAR SEAM

[75] Inventors: Keith Blazaitis, Farmington Hills; Darius J. Preisler, Macomb, both of Mich.

[73] Assignee: Larry J. Winget, Leonard, Mich.

[21] Appl. No.: 09/113,246

[22] Filed: Jul. 10, 1998

[51] Int. Cl.$^7$ ................................ B60R 21/20
[52] U.S. Cl. ........................................ 280/728.3
[58] Field of Search ................ 280/728.3, 731, 280/732

[56] References Cited

U.S. PATENT DOCUMENTS

| | | |
|---|---|---|
| 4,325,568 | 4/1982 | Clark et al. . |
| 4,895,389 | 1/1990 | Pack, Jr. ............................ 280/728.3 |
| 5,085,462 | 2/1992 | Gualtier . |
| 5,186,490 | 2/1993 | Adams et al. . |
| 5,312,130 | 5/1994 | Baba . |
| 5,320,380 | 6/1994 | Hamada et al. . |
| 5,335,935 | 8/1994 | Proos et al. . |
| 5,342,086 | 8/1994 | Harris et al. ...................... 280/728.3 |
| 5,382,398 | 1/1995 | Draxlmaier, Jr. . |
| 5,447,328 | 9/1995 | Iannazzi et al. . |
| 5,498,026 | 3/1996 | Eckhout . |
| 5,536,037 | 7/1996 | Cherry . |
| 5,549,324 | 8/1996 | Labrie et al. . |
| 5,558,364 | 9/1996 | Davis . |
| 5,567,375 | 10/1996 | Filion et al. . |
| 5,571,597 | 11/1996 | Gallagher et al. . |
| 5,588,669 | 12/1996 | Leonard et al. . |
| 5,630,612 | 5/1997 | Yamamoto et al. .................. 280/728.2 |
| 5,639,116 | 6/1997 | Shimizu et al. . |
| 5,641,554 | 6/1997 | Koizumi et al. ...................... 280/728.3 |
| 5,650,115 | 7/1997 | Proos et al. . |
| 5,662,350 | 9/1997 | Bathon et al. . |
| 5,664,801 | 9/1997 | Gray et al. . |
| 5,683,101 | 11/1997 | Davis et al. . |
| 5,685,560 | 11/1997 | Sugiyama et al. .................... 280/728.3 |
| 5,776,522 | 7/1998 | Budnick ................................. 425/577 |

Primary Examiner—Peter C. English
Attorney, Agent, or Firm—Brooks & Kushamn PC

[57] ABSTRACT

A method and apparatus for making a thermoplastic air bag cover having a visually perceptible tear seam formed by a controlled amount of plastic sinkage during an injection molding process. A molten thermoplastic is injected into a mold cavity of a mold having a shape defining the air bag cover. The mold includes first and second mold halves which form the interior and exterior surfaces of the air bag cover. The first mold half has an outwardly extending projection which cooperates with a smooth inner surface of the second mold half to form the tear seam design in the air bag cover which appears on the outer surface of the air bag cover. The tear seam design formed on the outer surface of the air bag cover is primarily formed because of the near right angles formed at the top edges of the outwardly extending projection which cause the outer surface of the air bag cover to sink to a limited controlled extent during cooling of the plastic beneath its softening point. The completed air bag cover is then removed from the mold. The thickness of the air bag cover at the tear seam is within a range of 0.2 to 0.4 millimeters.

1 Claim, 3 Drawing Sheets

AIR BAG COVER HAVING A VISUALLY PERCEPTIBLE TEAR SEAM

CROSS-REFERENCE TO RELATED APPLICATION

This application is related to U.S. patent application Ser. No. 08/639,701, filed Apr. 29, 1996, U.S. Pat. No. 5,776, 522.

TECHNICAL FIELD

This invention relates to a plastic air bag cover and a method and apparatus of making same and, in particular, to a plastic air bag cover having a visually perceptible tear seam and a method and apparatus of making same.

BACKGROUND ART

Presently, when air bag covers are provided in automobiles on the driver side of the vehicle, the air bag is stored in the steering column behind an air bag cover. During automatic inflation of the air bag, the air bag cover moves away from the steering column to permit its safety function between the steering column and the operator of the vehicle. Air bag covers may also be provided on the passenger side of the vehicle as well.

Recent practice in the automotive industry is utilization of all plastic fabricated air bag covers. Conventional air bag covers used in conjunction with occupant restraint systems often include noticeable or visually perceptible tear seams or scores disposed on the exterior surface of the air bag cover. The tear seams or scores represent selected weakened surfaces where the inflating air bag initially separates or breaks through the air bag cover and moves away from the steering wheel to perform its safety feature.

U.S. Pat. No. 4,325,568 issued to Clark et al. discloses a modular occupant restraint system including an inflator, a cushion, a container for the cushion and an air bag cover for the container assembled as a module. Clark et al. further discloses the use of score lines that are visually perceptible from a front view of the air bag cover as it is operably mounted on the steering wheel of the automobile.

U.S. Pat. No. 5,085,462 issued to Gaultier discloses an air bag and vehicle horn switch assembly. The assembly of Gaultier also discloses use of an air bag cover including visually perceptible exterior break seams or score lines in the operable mounted position within the vehicle.

U.S. Pat. No. 5,186,490 issued to Adams et al. discloses a cover for an inflatable restraint system for a motor vehicle which contains a slot in the upper wall thereof into which a thin or membrane type switch assembly is inserted. Adams et al. further discloses an air bag cover having an injection molded thermoplastic upper wall and a soft outer cover exposed to the interior of the vehicle manufactured from urethane, vinyl or polyester. The outer cover completely encompasses and overlaps the upper wall structure and uninflated air bag forming two structures the air bag must exit to carry out its function.

It is also known that the provision of noticeable exterior break seams or score lines that are designed for aesthetic purposes is very difficult to achieve as the final design obtained must satisfy engineering requirements related to inflation and exit of the air bag. Thus, use of visually noticeable exterior outer score lines is limited to known score line designs such as the "H" shaped score lines disclosed in U.S. Pat. No. 5,085,462 to Gaultier.

There has been attempts to hide the break seam on the air bag cover, as illustrated in U.S. Pat. No. 5,498,026 and the above-noted application.

One problem with such a hidden break seam is that the occupant of the vehicle does not know whether an air bag device is in the vehicle and, consequently, such hidden break seams may cause some anxiety.

Typically, a tear seam is formed into an air bag cover by injecting plastic into an injection mold in which the mold cavity includes a projection defining the tear seam. An example is illustrated in U.S. Pat. No. 5,335,935 issued to Proos et al. However, with this method it is difficult to inject the plastic over the projection, resulting in swirl lines caused by turbulence. Also, it is very difficult to have molten plastic flow over the projection, therefore, the thickness of the tear seam is limited, typically 0.4 millimeters or more.

U.S. Pat. No. 5,320,380, issued to Hamada et al., discloses an air bag cover having a hidden tear seam of less than 0.4 millimeters. However, this air bag cover is manufactured utilizing RIM (Reaction Injection Molding) technology. With RIM, a mold cavity supporting a mesh screen is injected with two liquid materials that chemically react to form a thermoset product. However, a product manufactured utilizing RIM molding is relatively more expensive, less durable and heavier than a product manufactured utilizing thermoplastic injection molding.

U.S. Pat. Nos. 5,549,324; 5,536,037; and 5,312,130 disclose physical air bag doors on vehicle instrument panels.

U.S. Pat. Nos. 5,664,801; 5,662,350; and 5,588,669 disclose covers for air bag modules having visible seams.

U.S. Pat. No. 5,447,328 discloses an instrument panel having an integral door cover for concealing an air bag that is cast in a special mold with a raised apex rib that forms grooves outlining a flap.

U.S. Pat. No. 5,382,398 discloses a method for fabricating an interior furnishing part in which a material sheet is provided with a recess or rib in the exterior face during molding.

U.S. Pat. No. 5,571,597 discloses a molded trip panel that is circumscribed by a simulated seam.

U.S. Pat. No. 5,558,364 discloses a plastic air bag cover having an integrated light source for use in a passenger compartment which is transmitted through indicia stating "SRS Airbag".

U.S. Pat. No. 5,683,101 discloses an automotive seat plastic air bag cover having transparent indicia noting "SRS".

U.S. Pat. No. 5,639,116 discloses a physical opening allowing access to an air bag module for maintenance.

U.S. Pat. No. 5,650,115 discloses a method of making air bag covers by enclosing the cover material in a mold, and advancing a projection on a mold portion against a covering material to form a tear seam.

U.S. Pat. No. 5,567,375 discloses a method and apparatus for forming an air bag cover with a lesser strength tear strip insert.

DISCLOSURE OF THE INVENTION

It is thus a general object of the present invention to provide an inexpensive and relatively simple method and system for making a thermoplastic air bag cover having a visually perceptible tear seam formed by plastic sinkage.

It is yet another object of the present invention to provide a method and system for making the thermoplastic air bag cover having the visually perceptible tear seam formed by a controlled amount of plastic sinkage during an injection molding process.

In carrying out the above objects and other objects, features and advantages of the present invention, a method is provided for making an air bag cover for an inflatable air bag system in a plastic injection mold having first and second mold halves which provide a cover-definig cavity with a restricted-flow, tear seam-defining portion in a closed position of the mold. The air bag cover includes front and back surfaces having a tear seam visually perceptible from the front surface. The method includes the steps of injecting molten thermoplastic into the cover-defining cavity of the mold and through the restricted-flow, tear seam-defining portion in the closed position of the mold. The method further includes allowing the tear seam of the air bag cover to sink before the molten thermoplastic completely solidifies to form the visually perceptible tear seam. The method also includes permitting the resulting air bag cover to cool to a temperature beneath the softening point of the plastic, and removing the completed air bag cover from the mold.

In further carrying out the above objects and other objects, features and advantages of the present invention, a thermoplastic injection mold is provided for making an air bag cover for an inflatable air bag system. The air bag cover includes front and back surfaces having a tear seam visually perceptible from the front surface. The mold includes a first mold half and a second mold half. The first and second mold halves have first and second surfaces, respectively, which provide a cover-defining cavity. The first surface has an outwardly extending projection and the second surface is relatively smooth to provide a restricted-flow, tear seam-defining portion of the cover-defining cavity in the closed position of the mold. The projection is sized and shaped and spaced away from the second surface sufficiently in the closed position of the mold to cause the plastic to shrink during cooling to thereby form the visually perceptible tear seam.

Still further, in carrying out the above objects and other objects, features and advantages, of the present invention, an air bag cover having a visually perceptible tear seam is provided. The air bag cover includes a thermoplastic elastomeric body molded in an injection mold wherein the resulting thickness of the tear seam is within 0.2–0.4 millimeters.

The above objects and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
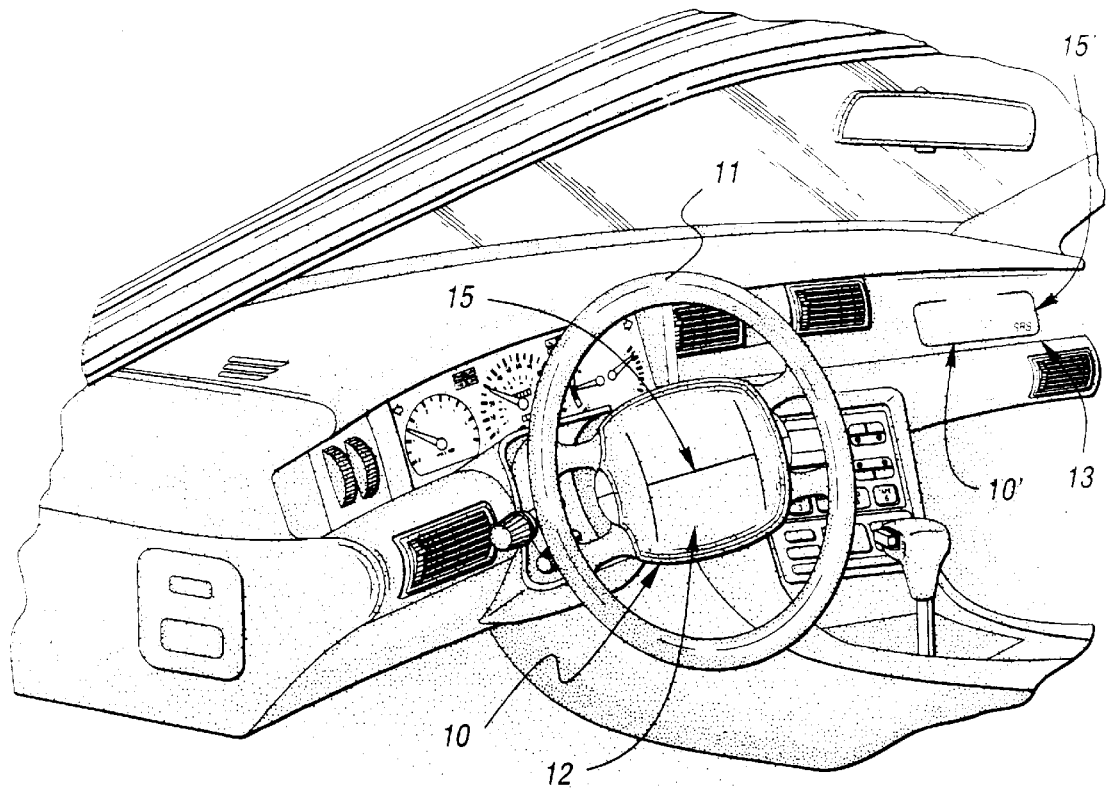
FIG. 1 is an environmental view showing a driver's side air bag cover and a passenger's side air bag cover both of which are constructed in accordance with the method of the present invention.

Referring now to FIG. 1, there is illustrated an environmental view showing a pair of air bag covers, generally indicated at 10 and 10', both of which are constructed in accordance with the present invention. The air bag cover 10 preferably is installed over an inflatable air bag system mounted at the end of a steering wheel post (not shown) having a steering wheel 11. The occupant restraint air bag system is typically mounted at the interior end of the steering wheel post within the steering wheel 11 so that the air bag may deploy between the vehicle driver and the steering wheel post to prevent injury during an accident or other period of sudden deceleration.

The air bag cover or door 10' is preferably hingedly mounted as part of an instrument panel section, generally indicated at 13. Since visually perceptible tear seams, generally indicated at 15 and 15', are formed substantially identically for the air bag covers 10 and 10', respectively, only the air bag cover 10 will be hereinafter described.

Figure 2:
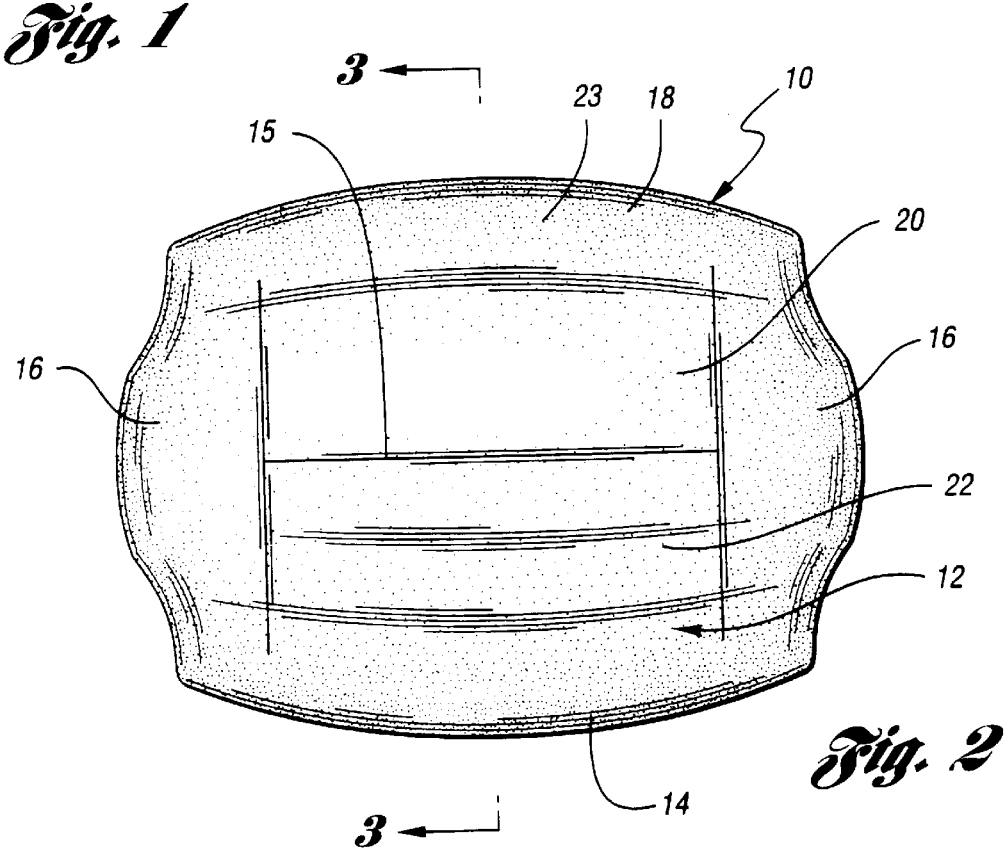
FIG. 2 is a front elevational view of the driver's side air bag cover adapted to be mounted at an end of a steering wheel post.
Figure 3:
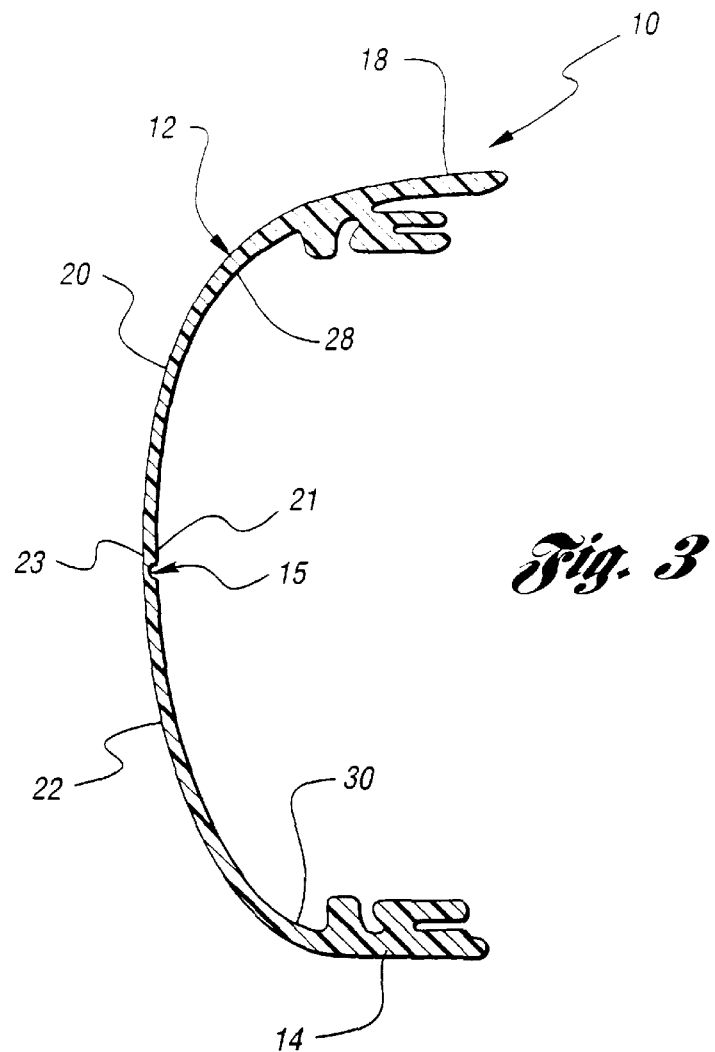
FIG. 3 is a sectional view of the air bag cover of FIG. 2 taken along lines 3—3 in FIG. 2.

Referring now to FIGS. 2–3, there is illustrated in detail the air bag cover 10 constructed in accordance with the present invention. The air bag cover 10 may or may not include a horn switch therein but is shown without a horn switch for the sake of simplicity.

A front panel, generally indicated at 12 of the air bag cover 10, is integrally formed with side panels 14, 16 and 18. The front cover 12 includes an inner surface 21 and an outer surface 23. The outer surface 23 is disposed to face the vehicle operator (not shown).

The front panel 12 includes upper and lower portions 20 and 22, respectively. The upper and lower portions 20 and 22 are interconnected to each other at the visually perceptible tear seam 15. The tear seam 15 is of reduced thickness to permit an air bag, as it is inflating, to exert a force at the lower portion 22 of the front panel 12 to cause the upper and lower portions 20 and 22 of the front panel 12 to separate from each other along the tear seam 15.

The upper portion 20 of the front panel 12 is hingedly connected to the side panel 18 at a hinge 28 and the lower portion 22 of the front panel 12 is hingedly connected to the bottom side panel 14 at a hinge 30, as best shown in FIG. 3. After separation from the side panels 16 (i.e. FIG. 2), the upper and lower portions 20 and 22 of the front panel 12 can swing upwardly and downwardly, respectively, and out of the way of the inflating air bag.

The tear seam 15 is, as discussed above, necessarily designed to allow inflation and exit of an air bag (not shown) from the air bag cover 10 to permit its safety function between the steering column and operator (not shown). The tear seam 15 is therefore designed to be the primary or sole, break area of the air bag cover 10 during inflation and exit of the air bag.

Figure 4:
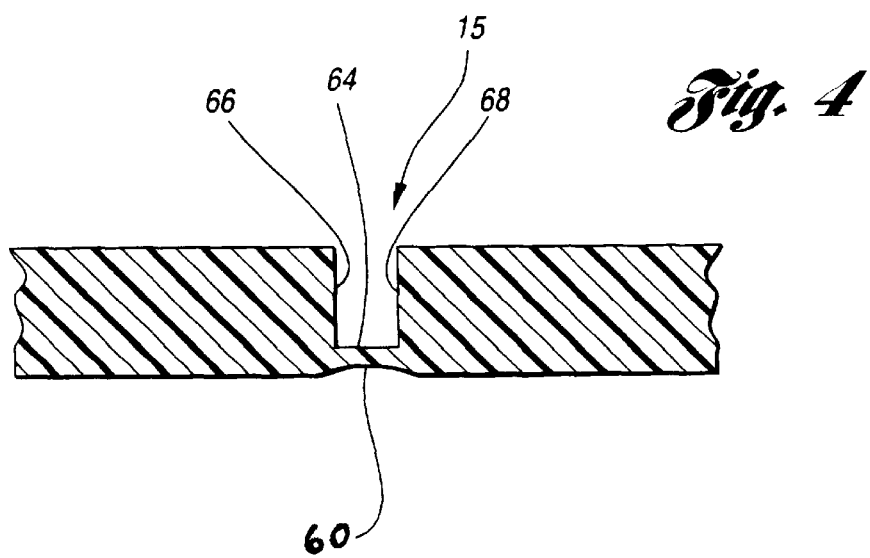
FIG. 4 is an enlarged view of a tear seam constructed in accordance with the present invention.

Referring to FIG. 4, the tear seam 15 includes, in the preferred embodiment, a concave exterior surface 60, a substantially flat interior surface 64 and substantially flat side interior surfaces or walls 66 and 68 immediately adjacent the interior surface 64. The side interior surfaces 66,68 are disposed in a symmetrical, facing relationship with respect to the interior surface 64. The angle between each side surface 66 or 68 and the flat surface 64 is in the range of 90° to 95° and, preferably, in the range of 91° to 94°. The thickness of the seam 15 between the concave exterior surface 60 and the inner surface 64 is in the range of 0.2 to 0.4 millimeters for proper air bag deployment after plastic shrinkage as described hereinbelow. As shown in FIG. 4, the width of the concave exterior surface 60 is greater than the substantially uniform distance between the side interior surfaces 66 and 68.

The tear seams 15 and 15' are visually perceptible from the exposed outer surfaces of the cover 10 and the cover 10'. As shown in FIG. 4, the tear seam 15 constructed in accordance with the present invention provides an outer surface 23 of the front cover 12 which is disturbed by the inclusion of the concave surface 60. From the exterior, exposed side of the air bag cover 10, i.e, the outer surface 23, the tear seam 15 is visually perceptible to assure the occupants of a vehicle that an air bag is disposed therewithin.

The air bag cover 10 of the present invention therefore provides a cover which does not require any additional parts or cover-up decorating pieces to afford a clean, aesthetically pleasing outer surface. Visually noticeable "U" or "H" shaped designs are provided with the present invention. However, it is to be understood that aesthetic front cover designs can be provided on air bag covers which are unrelated and unaffected by the presence of the visually perceptible tear seam 15.

It is preferred that the air bag cover 10 of the present invention be manufactured from a flexible thermoplastic material such as TPO provided by D and S, DYM provided by Dupont, "Santoprene" 201-87 provided by Advance Elastomers Systems of Auburn Hills, Mich., and other similar thermoplastic materials.

Figure 5:
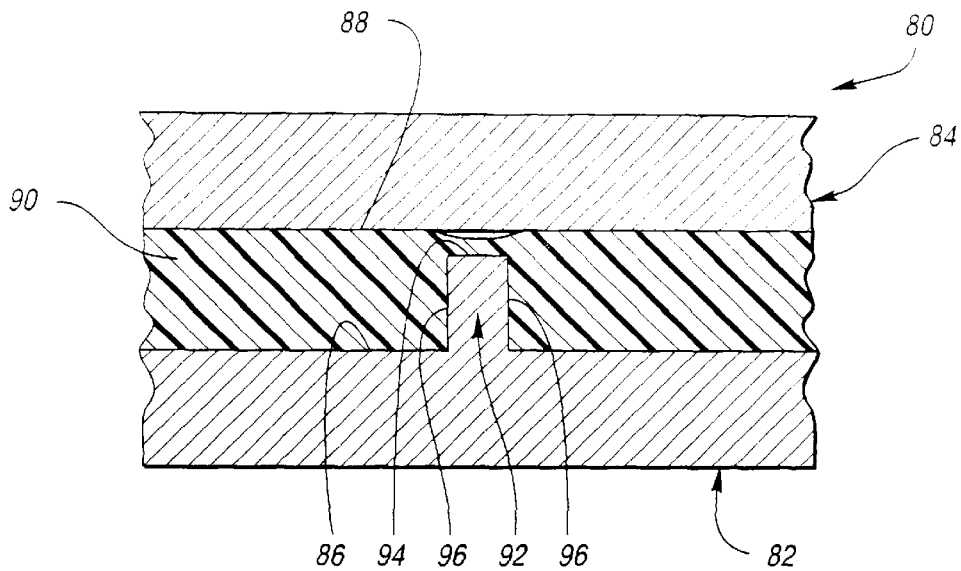
FIG. 5 is a schematic view, partially broken away and in cross-section, of a mold in its closed position and which may be utilized to make the air bag cover of the present invention.

Referring now to FIG. 5, there is schematically illustrated an injection mold, generally indicated at 80, for making the air bag cover 10 of the present invention in its closed position. In particular, those parts of the mold 80 which form the tear seam 15 are shown.

Briefly, the mold 80 forms part of an injection molding system including an injection molding machine (not shown). Such a machine typically includes a nozzle for injecting predetermined amounts or shots of molten resin. The injection molding machine also typically includes a hydraulic screw ram which is disposed in a bore formed in a barrel of the injection molding machine. The ram plasticizes and advances resin towards the nozzle. Upon complete plasticization of the resin, the screw ram is hydraulically advanced towards threaded portions of the barrel to inject molten plastic through the nozzle, as is well known in the art.

The mold 80 includes a first mold half, generally indicated at 82, and a second mold half, generally indicated at 84. Opposing surfaces 86 and 88 of the first and second mold halves 82 and 84, respectively, define a cover-defining mold cavity 90. The surface 88 of the second mold half 84 is generally smooth.

The first mold half 82 includes an integrally formed projection, generally indicated at 92, having a flat top surface 94, and flat side surfaces 96 which extend downwardly from the flat top surface 94 at an angle in the range of 90° to 95° and, preferably, in the range of 91° to 94°. The smooth surface 88 of the second mold half 84 and the surfaces 86, 96 and 94 are spaced apart from each other (in the closed position of the mold) and are sized and dimensioned to form a restricted-flow, tear seam-defining portion of the cavity 90. This portion of the cavity 90 restricts but does not present plastic flow therethrough so that during cooling the plastic therein contracts to form the tear seam 15. In other words, the concave surface 60 of the visually perceptible tear seam 15 is formed by sinkage or sink marks on the exterior surface 23 of the cover 10. Plastic flow is restricted through the restricted-flow, tear seam-defining portion of the cavity 90 to ensure that sink marks are formed.

In other words, during the typical injection molding process of an air bag cover 10, the first and second mold halves 82 and 84 are brought together to form the desired shape of the air bag cover 10. After the plastic has been injected but before it solidifies completely, the plastic shrinks or contracts at a location (i.e., the concave surface 60) defining the tear seam 15.

Figure 6:
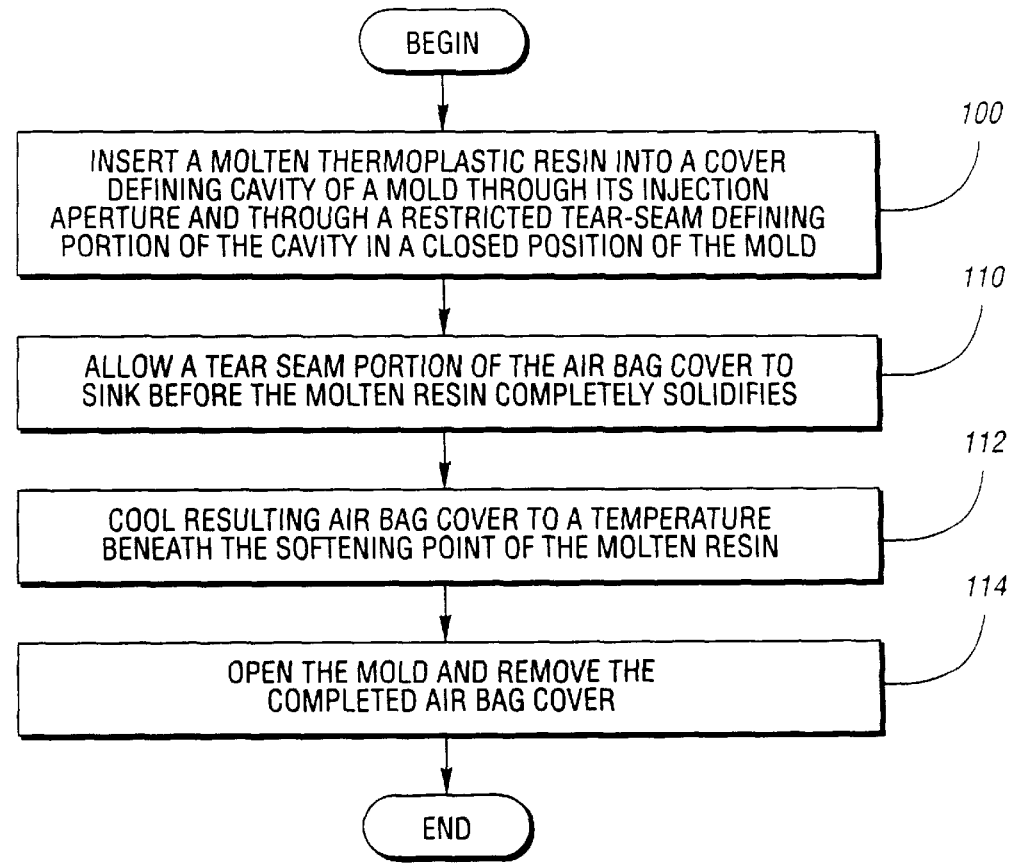
FIG. 6 is a block diagram flow chart illustrating the various method steps taken to practice the method of the present invention in order to make the air bag cover having the visually perceptible tear seam.

Referring now to FIG. 6, there is illustrated the various process steps of the method of the present invention. At block 100, molten thermoplastic resin is first inserted into the mold cavity 90 of the plastic mold 80 through its injection aperture (not shown) and through the restricted-flow, tear seam-defining portion of the cover-defining cavity 90.

The projection 92 has a shape defining the tear seam 15 and is positioned adjacent the smooth inner surface 88 of the second mold half 84 so that the part of cover 10 which defines the seam 15 sinks or contracts before the resin completely solidifies, as shown at block 110.

As shown at block 112, the resulting air bag cover is cooled to a temperature beneath the softening point of the molten resin.

Finally, at block 114, the mold 80 is open and the completed air bag cover 10 is removed.

In this way, the thermoplastic air bag cover 10 is formed with a visually perceptible tear seam 15 at which the thickness of the air bag cover 10 at the tear seam 15 is minimized. A reduced thickness in the tear seam 15 allows the use of less pressure to inflate the air bag. Restricted plastic material flowing over the projection 92 causes sink marks which define the seam 15. Furthermore, the thermoplastic air bag cover 10 is less expensive, lighter in weight and more durable than an equivalent air bag cover manufactured utilizing RIM molding.

While the best modes for carrying out the invention have been described in detail, those familiar with the art to which this invention relates will recognize various alternative designs and embodiments for practicing the invention as defined by the following claims.

What is claimed is:

1. An air bag cover for an inflatable air bag system having front and back surfaces and having a tear seam visually perceptible from the front surface to allow an air bag to exit the air bag cover during deployment, the air bag cover comprising:

a thermoplastic elastomeric body molded in an injection mold; and wherein a thickness of the tear seam is within 0.2 to 0.4 millimeters wherein the tear seam has a visually perceptible concave exterior surface having a width substantially perpendicular to the thickness of the tear seam and a flat inner surface defining a break portion of the tear seam and a pair of walls extending at an angle of 90° to 95° from the flat inner surface and spaced a substantially uniform distance apart and wherein the width of the concave exterior surface is greater than the substantially uniform distance between the pair of walls.

* * * * *